US012328597B2

United States Patent
McGarey et al.

(10) Patent No.: US 12,328,597 B2
(45) Date of Patent: Jun. 10, 2025

(54) METHODS AND SYSTEMS FOR VIRTUAL SITE INSPECTIONS

(71) Applicant: DISH Wireless L.L.C., Englewood, CO (US)

(72) Inventors: Mark McGarey, Longmont, CO (US); Zane Edwards, Denver, CO (US); Brad Cole, Englewood, CO (US); Luis Acuna, Denver, CO (US); David Robinson, Denver, CO (US); Mark Beecy, South Chatham, MA (US)

(73) Assignee: DISH Wireless L.L.C., Englewood, CO (US)

(*) Notice: Subject to any disclaimer, the term of this patent is extended or adjusted under 35 U.S.C. 154(b) by 0 days.

(21) Appl. No.: 18/215,809

(22) Filed: Jun. 28, 2023

(65) Prior Publication Data

US 2023/0337013 A1 Oct. 19, 2023

Related U.S. Application Data

(63) Continuation of application No. 17/404,867, filed on Aug. 17, 2021, now Pat. No. 11,729,630.

(51) Int. Cl.
*H04W 16/18* (2009.01)
*G06T 19/20* (2011.01)
*H04L 41/14* (2022.01)
*H04W 16/24* (2009.01)

(52) U.S. Cl.
CPC .......... *H04W 16/18* (2013.01); *G06T 19/20* (2013.01); *H04L 41/145* (2013.01); *H04W 16/24* (2013.01); *G06T 2210/04* (2013.01); *G06T 2219/2004* (2013.01)

(58) Field of Classification Search
CPC .......... G06T 19/20; G06T 2210/04; G06T 2219/2004; H04W 16/18; H04L 41/145
USPC ........................................... 345/419
See application file for complete search history.

(56) References Cited

U.S. PATENT DOCUMENTS

| | | |
|---|---|---|
| 2011/0156984 A1 | 6/2011 | Caldwell et al. |
| 2015/0286690 A1 | 10/2015 | Hu |
| 2016/0320775 A1 | 11/2016 | Priest |
| 2017/0346542 A1 | 11/2017 | Neves et al. |
| 2018/0041907 A1* | 2/2018 | Terry ............... G06T 17/05 |
| 2018/0158236 A1 | 6/2018 | Priest |
| 2022/0130145 A1* | 4/2022 | Connary ........... G06T 15/20 |
| 2023/0053611 A1 | 2/2023 | McGarey et al. |

* cited by examiner

*Primary Examiner* — Thomas J Lett
(74) *Attorney, Agent, or Firm* — Perkins Coie LLP

(57) ABSTRACT

A technique is directed to methods and systems of virtual site inspections. In some embodiments, a network operator navigates a drone which captures image data of equipment and layout of a site. The image data is processed and used to generate a 3D model of the site. A network operator virtually installs new equipment in the virtual representation of the site, and presents the 3D model of the site, with the new equipment in the proposed location, to a permitting authority. The permitting authority can review the 3D model of the new equipment at the site and approve or deny authorization for the network operator to physically install the equipment at the site. After the new equipment is installed, a network operator can capture image data of the installed equipment at the site to prove to the permitting authority that the equipment was installed at the site according to regulation.

20 Claims, 6 Drawing Sheets

METHODS AND SYSTEMS FOR VIRTUAL SITE INSPECTIONS

CROSS-REFERENCE TO RELATED APPLICATION(S)

This application is a continuation of U.S. patent application Ser. No. 17/404,867, filed Aug. 17, 2021, entitled "METHODS AND SYSTEMS FOR VIRTUAL SITE INSPECTIONS," which is hereby incorporated by reference in its entirety.

BACKGROUND

Network operators can install equipment at sites, such as on towers or building rooftops. At some sites, a network operator must get permission to install any equipment. However, most network operators are unaware where to install equipment to meet regulations.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
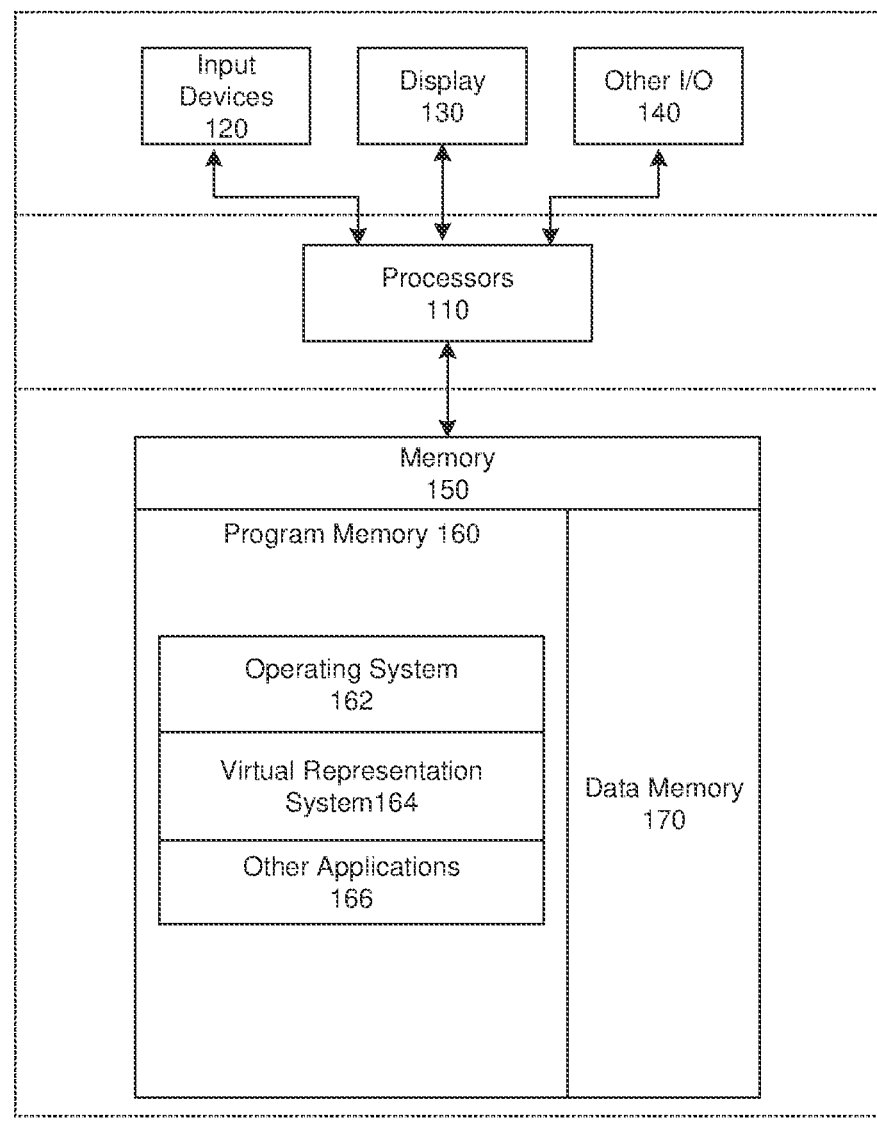
FIG. 1 is a block diagram illustrating an overview of devices on which some implementations can operate.

Aspects of the present disclosure are directed to methods and systems for virtual site inspections. Equipment, such as wireless communication equipment, are installed at sites (e.g., wireless tower, building rooftop, substation, base stations, cell sites, base transceiver stations, etc.). After a network operator installs equipment at a site, a permitting authority (e.g., fire department, inspector, licensing authority, city authority, etc.) inspects the site to verify the equipment complies with regulations. For example, how the equipment is spaced apart or located at a site based on the weight, dimensions, and/or radio frequency signature (e.g., electromagnetic radiation, signal strength, etc.) of the equipment. In some cases, site inspections by a permitting authority can take weeks or months to occur when the permitting authority has to travel to the physical location for an inspection.

In some implementations, a user (e.g., a network operator, installer, property owner, technician, etc.) navigates a device, such as a drone with a camera, around a site and captures image data (e.g., pictures or video) of the equipment and layout of a site. In a preferred embodiment, the image data is processed and used to generate a virtual representation (e.g., a 3D model or rendering) of the site. The image data can include a geolocation and/or relative location for each piece of network equipment identified and/or proposed within the image data. A user virtually installs new equipment in the virtual representation of the site, and presents (e.g., uploads to a data base or web portal) the virtual representation of the site, with the new equipment in the proposed location, to a permitting authority. The permitting authority can review the virtual representation of the new equipment at the site and approve or deny authorization for the user to physically install the equipment at the site. For example, in downtown areas of a city, rooftops of buildings are difficult to access, and it can take months for a permitting authority physically inspect the rooftop and give authorization for the installation of new equipment. Without requiring an inspector to physically go to the rooftop, a user can present the 3D representation of the new equipment on the rooftop to the inspector. The inspector (e.g., without physically inspecting the rooftop) can review the 3D representation and authorize the installation of the new equipment on the rooftop. After the new equipment is installed, a user can navigate the device and capture image data of the installed equipment at the site. The image data is processed and used to generate a second virtual representation of the site. The user can present the second virtual representation of the site to permitting authority to prove/verify that the equipment was installed at the site according to regulation.

In existing site inspection systems, remote users are unable to accurately inspect sites or provide authorization for the installation of equipment. The present embodiments collect image data of a site, generate a virtual representation of the site, virtually install new equipment in the virtual representation of the site, present the virtual representation to a permitting authority, receive authorization to physically install the equipment, and provide verification the equipment was installed as proposed in the virtual representation. The virtual site inspection system uses coordination between multiple disparate computing systems (e.g., drone data sources, user device data sources, systems for obtaining image data and creating virtual models, permitting authority systems, integrations with construction drawing systems, and user devices) to provide a new way to virtually inspect sites and receive authorization for the installation of equipment at sites. In addition, the technical processes used in the disclosed virtual site inspection can provide 1) increased virtual access to sites, such as towers or rooftops, by creating a 3D model of the site that can be accessed via a web browser; 2) reduced physical site visits by users; 3) increasing user safety by reducing site visits; 4) reducing costs by using the image data (e.g., 3D data) to create architectural drawings; 5) streamlined construction process by using the image data or virtual representation of the site to create construction drawings; and 6) reducing the time required to develop sites to network time protocol (NTP) or construction. The present embodiments provide a tool for utility coordination, a tool for jurisdiction zoning review (e.g., fire department), landlord discrepancy resolution, radio frequency line of site, remote bidding of projects, data management of inventory, site maintenance, or site security.

Several implementations are discussed below in more detail in reference to the figures. FIG. 1 is a block diagram illustrating an overview of devices on which some implementations of the disclosed technology can operate. The devices can comprise hardware components of a device 100 that manage entitlements within a real-time telemetry system. Device 100 can include one or more input devices 120 that provide input to the Processor(s) 110 (e.g. CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, virtual representation system 164, and other application programs 166. Memory 150 can also include data memory 170, entitlement data, user data, retrieval data, management data, authorization token data, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
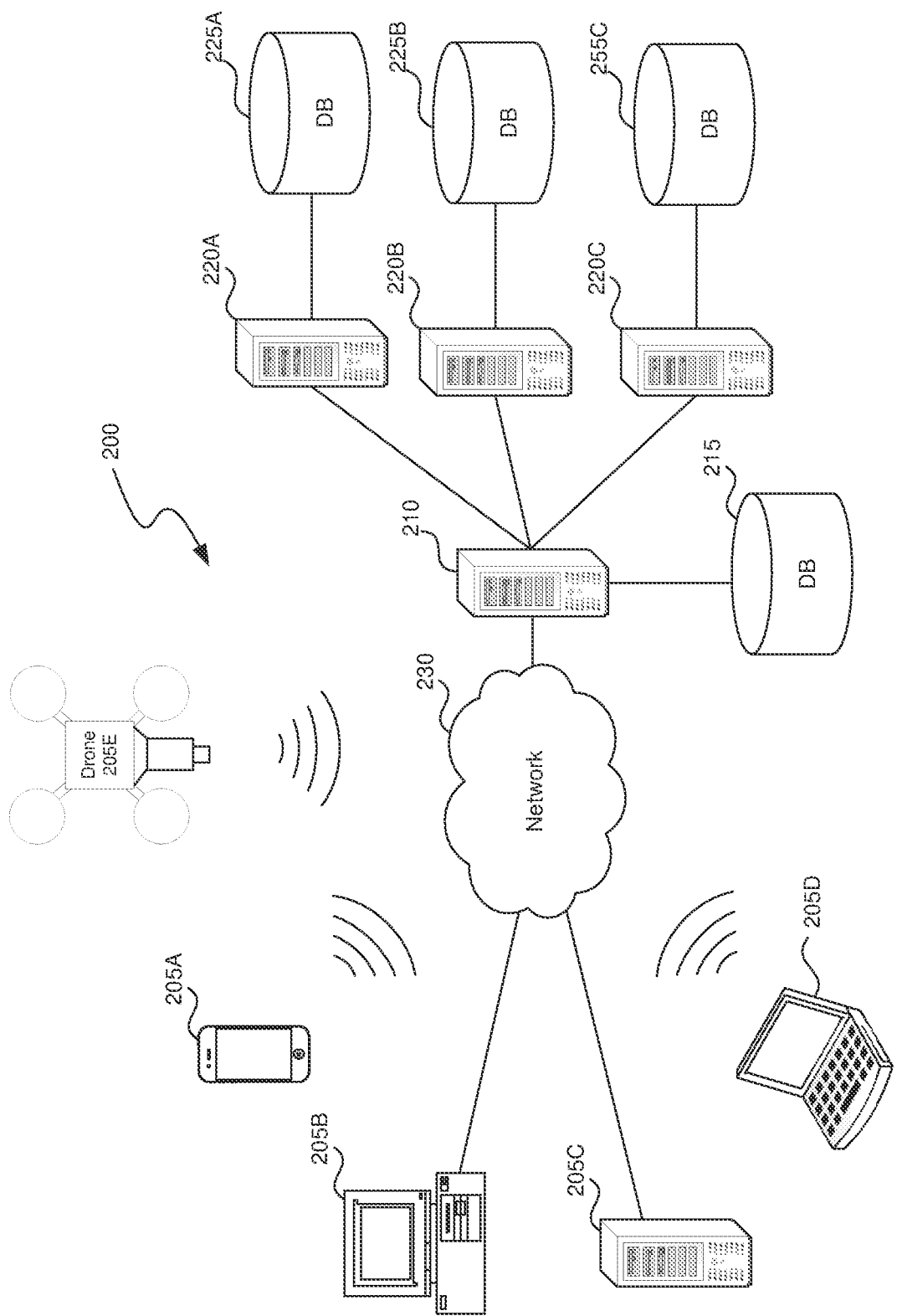
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-E, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information such as image data, user data, virtual representation data, drone data, sensor data, permitting authority data, authorization data, 3D model data, equipment data, site data, and geolocation data. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
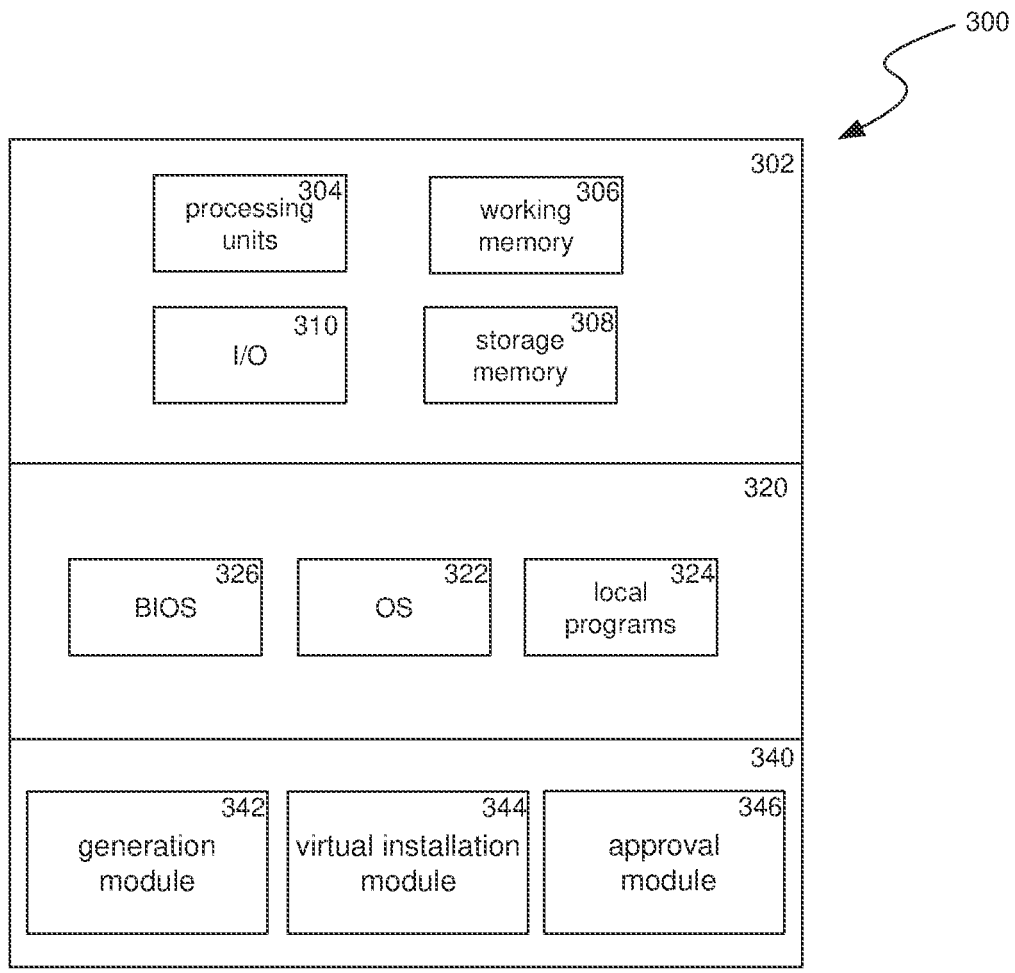
FIG. 3 is a block diagram illustrating components which, in some implementations, can be used in a system employing the disclosed technology.

FIG. 3 is a block diagram illustrating virtual site manager 300 which, in some implementations, can be used in a virtual representation system employing the disclosed technology. The virtual site manager 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). virtual site manager 300 can be implemented in a client computing device such as client computing devices 205 or on a server computing device, such as server computing device 210 or 220. Virtual site manager 300 can connect to a wide area network (WAN) to communicate with individual machines, and/or is encompassed within the machine itself.

General software 320 can include various applications including an operating system 322, local programs 324, and a basic input output system (BIOS) 326. Specialized components 340 can be subcomponents of a general software application 320, such as local programs 324. Specialized components 340 can include generation module 342, virtual installation module 344, approval module 346, and components which can be used for providing user interfaces, transferring data, and controlling the specialized components, such as interfaces for communications and sensor-specific functions. In some implementations, virtual site manager 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

In some embodiments, the generation module 342 is configured to generate the virtual representation with image data of the site. Generation module 342 receives, from a drone, the image data (e.g., 2D images) of a site and converts (e.g., using photogrammetry or stereophotogrammetry techniques) the image data into a virtual representation (e.g., 3D model) of the site. For example, generation module 342 processes the 2D images to extract image coordinates of objects in the image and converts the 2D image coordinates into 3D coordinates. A user can access the virtual representation in a user interface or a virtual reality environment. Additional details on generating a virtual representation are provided below in relation to block 402 of FIG. 4.

In some embodiments, the virtual installation module 344 is configured to identify and display available areas in the virtual representation to potentially install equipment at the site. For example, equipment at a site is positioned and oriented to comply with regulations (e.g., state or federal regulations) based on the type and size of equipment. Virtual installation module 344 identifies areas in the virtual representation to install equipment that comply with the regulations. Virtual installation module 344 virtually installs the equipment in the proposed location of the virtual representation and displays the virtually installed equipment in the virtual representation of the site. Virtual installation module 344 can identify individual equipment (e.g., type and size of the equipment, manufacturer, physical condition of the equipment, owner of the equipment, a geolocation, a 3D position, a relative position, or an equipment profile showing the interference and/or anther wireless transmission characteristic of the equipment) currently installed or proposed equipment to install at the site. Virtual installation module 344 can collect the information about the equipment from local databases or publicly available sources. Additional details on virtual installation of equipment are provided below in relation to block 404 of FIG. 4.

In some embodiments, the approval module 346 is configured to present the virtual representation to a permitting authority to receive approval for the installation of the equipment. Approval module 346 uploads to a permitting authority the virtual representation with the proposed installation. The permitting authority reviews the proposed installation in the virtual representation and provides to the approval module 346 approval for a user to physically install the equipment at the site. Approval module 346 can receive a notification of the approval from the permitting authority and provide an alert/notification to the user regarding the approval. After the equipment is physically installed at the site, approval module 346 sends, to the permitting authority, an image (or a second virtual representation) to provide verification the equipment was installed according to the proposal. For example, approval module 346 provides to the permitting authority a 3D module overlay of the final virtual representation and the proposed virtual representation, as proof the equipment was installed according to regulations. Additional details on approvals are provided below in relation to blocks 406, 408, and 410 FIG. 4.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
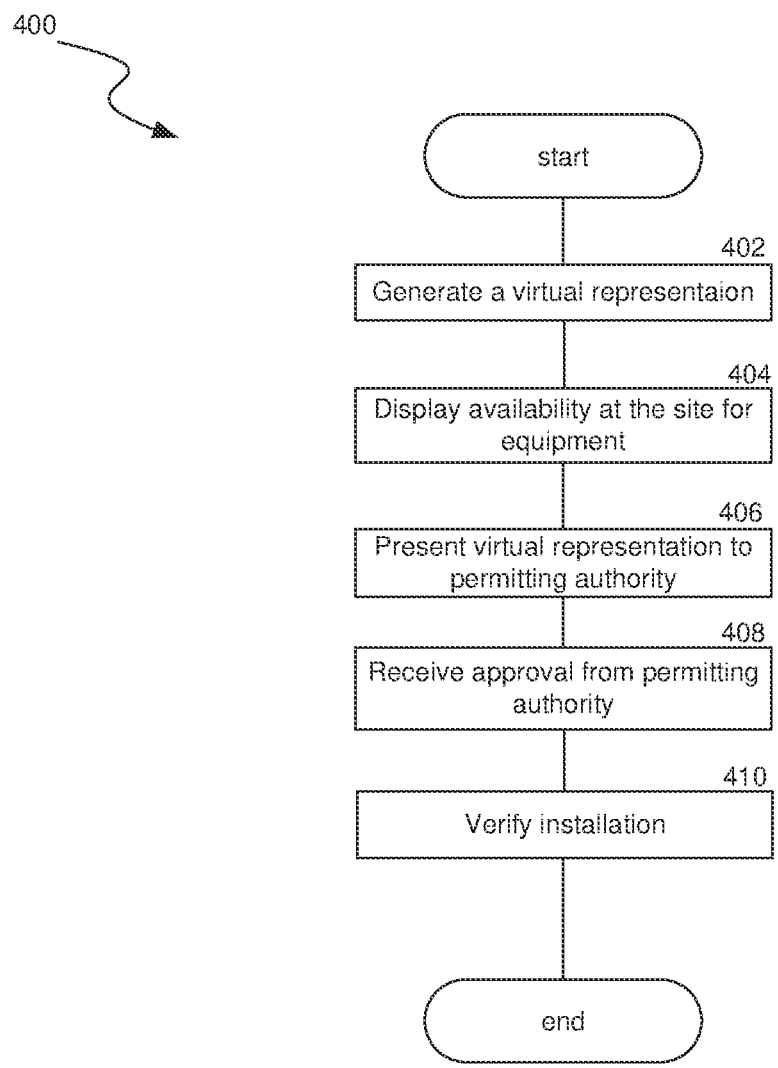
FIG. 4 is a flow diagram illustrating a process used in some implementations for virtual site inspections.

FIG. 4 is a flow diagram illustrating a process 400 used in some implementations for virtual site inspections. In a preferred embodiment, process 400 is triggered by a user (e.g., technician, site inspector, engineer, mechanic, etc.) uploading the image data from a drone flight to a database (or web portal), streaming the image data to a database during a drone flight, powering on a drone, streaming image data on a device while the user physically performs a site walk, a drone flying within a threshold distance of a site, or the geolocation of the drone being at the site. In various implementations, process 400 is performed locally on the user device or performed by cloud-based device(s) that can support virtual site inspections.

A user can navigate a drone, or any user device, throughout a site. In some cases, the drone connects to attachments, such as sensing devices (e.g., 2D or 3D cameras, infrared cameras, radio frequency (RF) measuring instruments, electromagnetic frequency measuring instruments, RF meters, range finders, geolocation, motion sensors, temperature sensors, vibration or tilt sensors, etc.), which collect data about the site. In a preferred embodiment, the drone collects image data (e.g., pictures or video) of the site. A "site" as used herein, refers a location where equipment is installed for operation. A site can include, but not limited to, a wireless tower, building rooftop, utilities structures, substations, base stations, cell sites, or base transceiver stations. The drone can capture image data from all directions of the equipment at the site or the topography of the site. "Equipment" as used herein, refers an apparatus, asset, instrument, or similar, which performs a function or operation. Equipment can include, but not limited to, antennas, transmitters, receivers, digital signal processors, control electronics, GPS devices, primary electrical power source, backup electrical power source, sheltering, transformers, utilities locations for power and fiber, lights, etc. The site scan by the drone can identify equipment, potential locations for equipment, or equipment that needs to be replaced (e.g., due to failure or weather damage).

At step 402, process 400 generates a virtual representation (e.g., 3D virtual model, panorama view, or 3D site view) using the image data of the site captured by the drone. The virtual representation of the site includes the equipment installed at the site, building structures, fences, roads, topography of the site, site identification features, site address, or geolocation coordinates of the site. Process 400 can identify, at the site, the type of equipment, the equipment owner/manufacturer (e.g., by accessing public databases to retrieve the information), the size/dimensions of the equipment, the distance between the equipment and other equipment or structures/objects, the type of tower (self-supporting towers, monopole, guyed, etc.), dimensions of the site, tower height, RAD height availability, space availability for additional equipment, antennas on the building or tower, ground compound at the site, fiber vault location, H-frame/gang member location, transformer/utility pole location, migratory bird flag at the site, safety signage, active FM antennas, safety hazards, site access, wildlife, vault outside of the site, view of right of way, paths for power/fiber conduits, closest right of way for accessing/crossing over the site, RAD height panorama view with azimuth interface, keyhole markup language zipped (KMZ) from fiber providers, near map integration, or path profile. In some cases, process 400 identifies obstructions (e.g., buildings, hills, mountains, trees, etc.) in and around the site that could interfere with transmissions in and out of the site. In other cases, process 400 identifies a centerline of the site or the centerline view of near-field obstructions or clutter. Process 400 can provide in the virtual representation a panorama view of the site with azimuths (e.g., a horizon view facing outwards from the site to the horizon or including a bar with the azimuth of the direction facing view). Process 400 can include ground photo enhancements (e.g., an embedded photo with detail of fiber vaults, transformers, H-frame/gang meter, or the nearest utility pole) in the virtual representation. In some implementations, process 400 converts the virtual representation into a construction drawing (e.g., CAD drawing, architectural drawings, structural drawings, electrical drawings, etc.). In some cases, process 400 provides RF verification of equipment by performing emissions studies using the data captured by the drone Process 400 can display the virtual representation as a desktop tool on a user interface that users can access and perform virtual site walks. At step 404, process 400 displays, in the virtual representation, availability at a position of the site for installation of additional equipment. Process 400 identifies a capacity at the site for additional equipment and a location for the additional equipment to be installed at the site. For example, process 400 displays a virtual representation that highlights or identifies existing network equipment versus proposed network equipment. Process 400 can identify or highlight a substitute plan or individual substitute equipment in the virtual representation. For example, the substitute plan or substitute equipment may or may not necessarily be visible or accessible to the regulator (e.g., permitting authority, such as the fire department inspectors) unless and until the regulator denies a specific piece of equipment or proposed plan.

In some cases, a user selects where to install the equipment. In other cases, industry standards indicate where to install the equipment to comply with the standards. In a preferred embodiment, process 400 virtually installs (e.g., adds the equipment in the 3D model) the equipment in the virtual representation of the site. The virtual representation of the site displays a projection of the proposed location/space where the equipment will be physically installed at the site. For example, process 400 displays an image with proposed network equipment superimposed upon an existing image of the site. Process 400 can determine whether the position and orientation of proposed equipment complies with industry standards. Process 400 can identify the type and size of the proposed equipment and currently installed equipment and determine the spacing required between the proposed and currently installed equipment to comply with industry standards. In some implementations, process 400 can generate a notification (e.g., message, alert, etc.) to indicate to a user whether the proposed installation complies with the industry standards.

Figure 5:
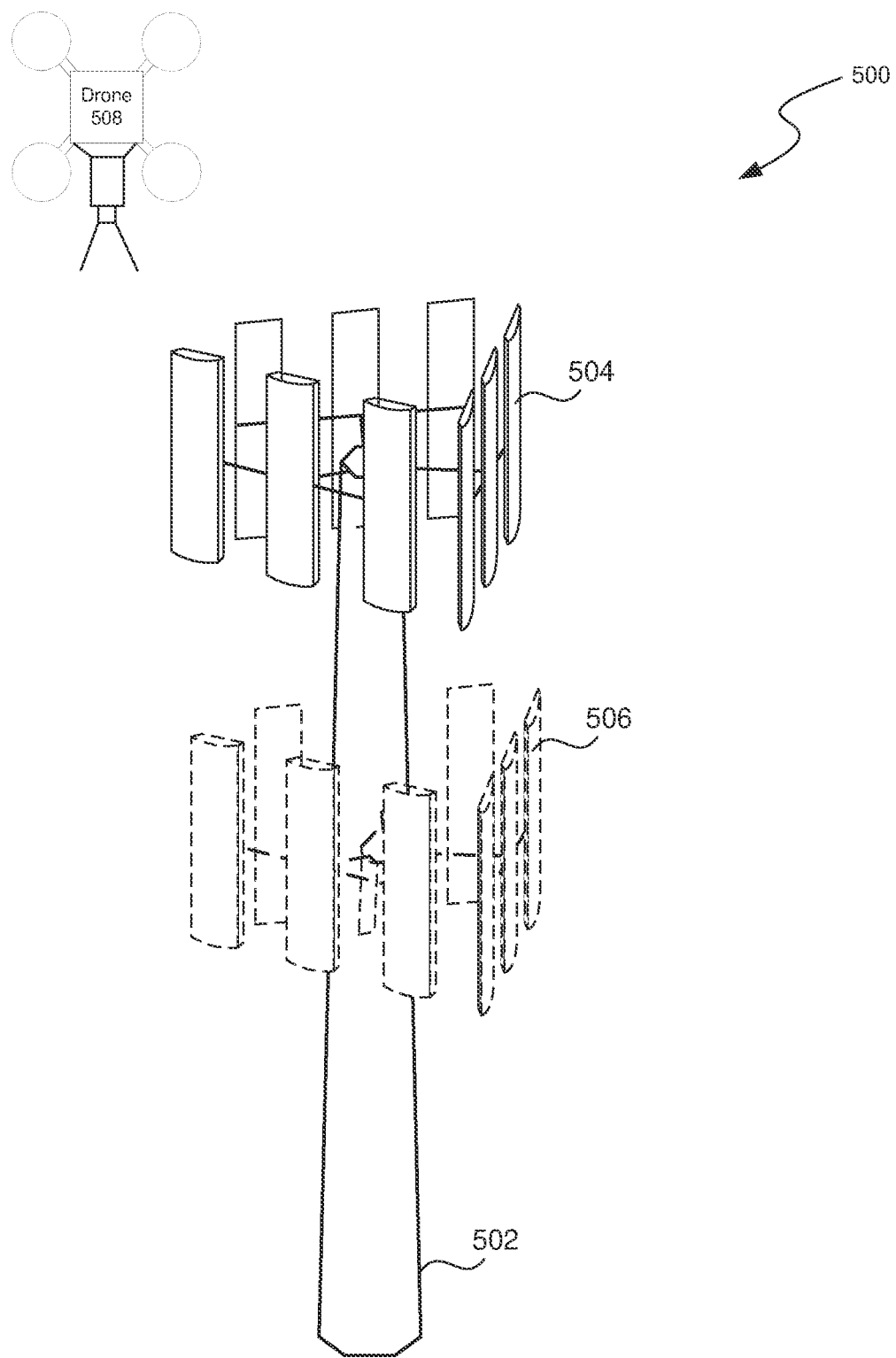
FIG. 5 is a conceptual diagram illustrating an example of a virtual site inspection of a wireless communication tower.
Figure 6:
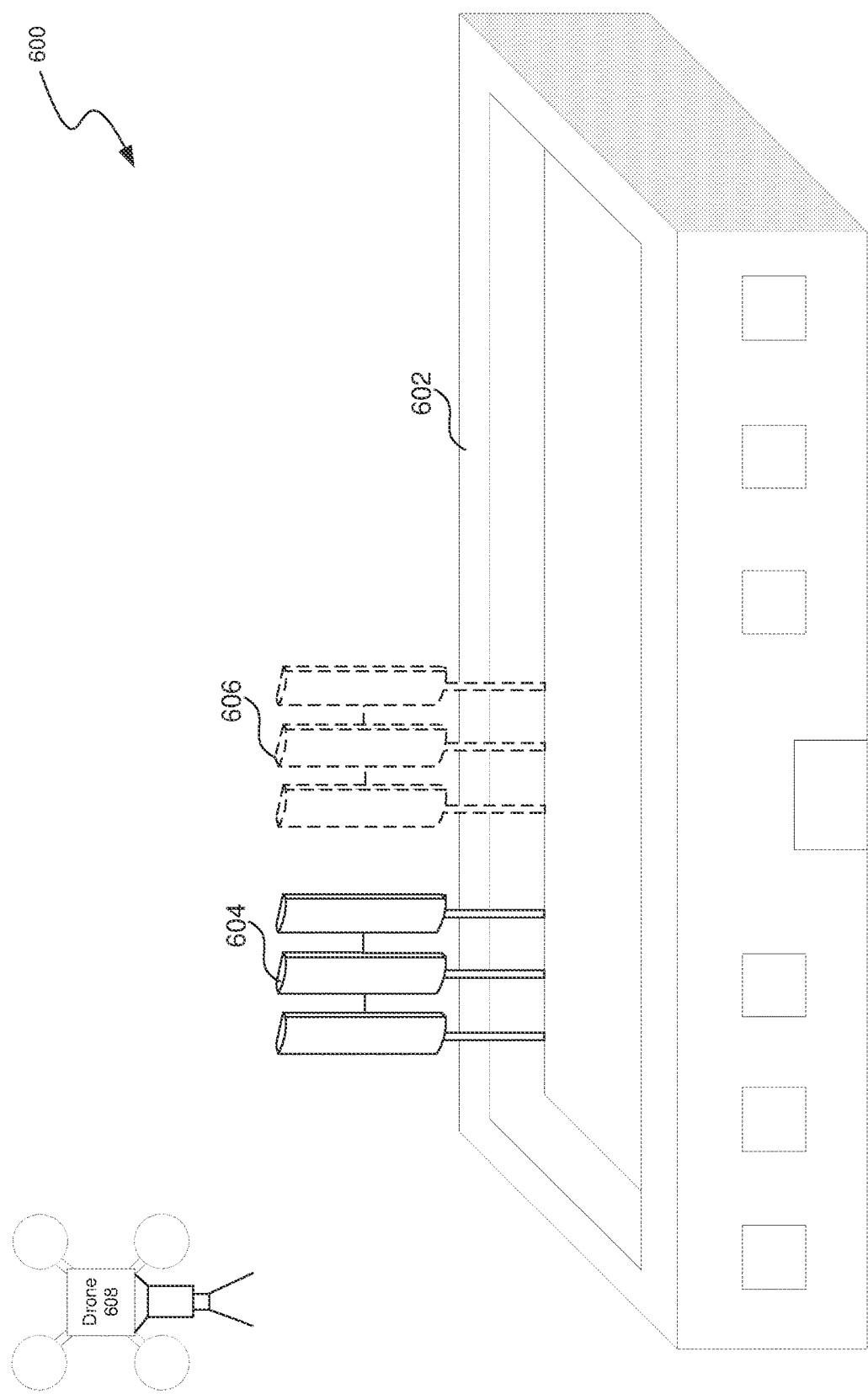
FIG. 6 is a conceptual diagram illustrating an example of a virtual site inspection of a rooftop.

In an example, as illustrated in example 500 of FIG. 5, image data from drone 508 is used to create a 3D model which displays proposed equipment 506 on the wireless tower 502 at a proposed location below equipment 504. In another example, as illustrated in example 600 of FIG. 6, image data from drone 608 is used to create a 3D model which displays proposed equipment 606 on the building rooftop 602 at a proposed location next to equipment 604. In some implementations, process 400 can use plugins to the virtual representation to edit the virtual model, virtually install equipment, or to analyze the terrain profile of the site. For example, process 400 identifies the location, position, and orientation to install antennas at site based on the surrounding terrain.

At step 406, process 400 presents, to a permitting authority (e.g., fire department, inspector, licensing authority, city authority, etc.) the virtual representation with the additional equipment, to receive approval for the installation of the new equipment at the proposed location/position in the site. In some cases, process 400 uploads the virtual representation of the site to the permitting authority database or web portal. Process 400 can convert the virtual representation into a construction drawing (e.g., CAD drawing, architectural drawings, structural drawings, electrical drawings, etc.) before submitting the virtual representation to the permitting authority. The permitting authority can review the virtual model of the new equipment virtually installed at the proposed location, without a physical site visit. The permitting authority can virtually inspect the positioning of the proposed equipment to determine if the size and type of equipment meets the standards/regulations at the site.

At step 408, process 400 receives the approval for the installation of the additional equipment at the physical site. In some cases, the approval is a notification which includes the virtual representation with a certification signature or stamp of approval. The notification can provide the user the authority to begin installation of the equipment. In some implementations the approval is an automated response based on the equipment getting installed. For example, when the empty area of a rooftop is above a threshold amount (e.g., 80% of the rooftop area is empty), the approval is automated for types of equipment with a footprint (e.g., weight and dimensions) below a threshold (e.g., weight and dimensions). Process 400 can receive an approval with conditional changes that may be illustrated within the 3D model. In some cases, process 400 transmits an update 3D model to the permitting authority based on the conditional changes/modifications received from the permitting authority. In other cases, process 400 transmits a message to the permitting authority that the changes are acknowledged and will be implemented when the equipment is physically installed. Process 400 can send the permitting authority an image as proof that the conditional changes were implemented in the physical installation of the equipment.

After the equipment is physically installed at the site, a user can navigate the drone and capture image data of the newly installed equipment at the site and/or a full scan of the site. Process 400 processes the image data and generates a second virtual representation of the site with the installed equipment. At step 410, process 400 overlays the second virtual representation on the first virtual representation to verify, to the permitting authority, the equipment was physically installed in the proposed location according to the approved plan. Overlaying can include layering one image over another, substituting elements from an image within another image, or generating an overlaid image (versus providing image layers). In some implementations, overlaying the image of the installed equipment on the model of the approved plan, highlights any differences or variances from the approved plan when submitting verification to the permitting authority. In some cases, process 400 transmits (uploads) an image of the installation or the second virtual representation to the permitting authority to verify the equipment was installed in compliance with regulations. Process 400 can present a before and after image of the site to the permitting authority to provide verification of the installation. The permitting authority can inspect the second virtual representation of the site to determine if the installed equipment is in violation of any regulations or codes. In some cases, process 400 sends a variance report to the permitting authority that shows a difference between the installed equipment and the approved installation plan of equipment at the site. In other cases, a third-party approves, on behalf of the permitting authority, the compliance with the approved/permitted plan versus actual installation.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for virtual modeling wireless communication equipment installment at a site, the method comprising:
   identifying a location at the site for an installation of wireless communication equipment;
   determining the location of the wireless communication equipment complies with wireless equipment regulations; and
   in response to determining the location complies with the wireless equipment regulations:
      prior to a physical installation of the wireless communication equipment at the location, generating a virtual model of the site that includes
         a first virtual representation of the wireless communication equipment virtually installed within the virtual model at the location at the site, and
         a second virtual representation of the wireless communication equipment virtually installed within the virtual model in at least one alternative location at the site, wherein the at least one alternative location is different from the location; and
      sending, to a permitting authority, one or more images of the first virtual representation and the second virtual representation of the wireless communication equipment virtually installed within the virtual model at the site.

2. The method of claim 1, further comprising:
determining a radio frequency signature at the location of the wireless communication equipment based on a type and size of one or more of the wireless communication equipment.

3. The method of claim 1, further comprising:
identifying a type and size of one or more of the wireless communication equipment at the site; and
determining the location at the site for the installation of the wireless communication equipment complies with the wireless equipment regulations based on the type and size of the one or more of the wireless communication equipment at the site.

4. The method of claim 1, further comprising:
overlaying an image of the installation of a type and size of one or more of the wireless communication equipment with the one or more images of the first virtual representation to verify the installation complies with the wireless equipment regulations.

5. The method of claim 1, further comprising:
generating a notification based on the location of the wireless communication equipment complying with the wireless equipment regulations.

6. The method of claim 1, further comprising:
generating the virtual model with image data of the site.

7. The method of claim 1, wherein the site is a wireless communication tower or a rooftop location.

8. A non-transitory computer-readable medium storing instructions that, when executed by a computing system, cause the computing system to perform operations for virtual modeling wireless communication equipment installment at a site, the operations comprising:
identifying a location at the site for an installation of wireless communication equipment;
determining the location of the wireless communication equipment complies with wireless equipment regulations; and
in response to determining the location complies with the wireless equipment regulations:
prior to a physical installation of the wireless communication equipment at the location, generating a virtual model of the site that includes
a first virtual representation of the wireless communication equipment virtually installed within the virtual model at the location at the site, and
a second virtual representation of the wireless communication equipment virtually installed within the virtual model in at least one alternative location at the site, wherein the at least one alternative location is different from the location; and
sending, to a permitting authority, one or more images of the first virtual representation and the second virtual representation of the wireless communication equipment virtually installed within the virtual model at the site.

9. The non-transitory computer-readable medium of claim 8, wherein the operations further comprise:
determining a radio frequency signature at the location of the wireless communication equipment based on a type and size of one or more of the wireless communication equipment.

10. The non-transitory computer-readable medium of claim 8, wherein the operations further comprise:
identifying a type and size of one or more of the wireless communication equipment at the site; and
determining the location at the site for the installation of the wireless communication equipment complies with the wireless equipment regulations based on the type and size of the one or more of the wireless communication equipment at the site.

11. The non-transitory computer-readable medium of claim 8, wherein the operations further comprise:
overlaying an image of the installation of a type and size of one or more of the wireless communication equipment with the one or more images of the first virtual representation to verify the installation complies with the wireless equipment regulations.

12. The non-transitory computer-readable medium of claim 8, wherein the operations further comprise:
generating a notification based on the location of the wireless communication equipment complying with the wireless equipment regulations.

13. The non-transitory computer-readable medium of claim 8, wherein the operations further comprise:
generating the virtual model with image data of the site.

14. The non-transitory computer-readable medium of claim 8, wherein the site is a wireless communication tower or a rooftop location.

15. A system comprising:
one or more processors; and
one or more memories storing instructions that, when executed by the one or more processors, cause the system to perform a process for virtual modeling wireless communication equipment installment at a site, the process comprising:
identifying a location at the site for an installation of wireless communication equipment;
determining the location of the wireless communication equipment complies with wireless equipment regulations; and
in response to determining the location complies with the wireless equipment regulations:
prior to a physical installation of the wireless communication equipment at the location, generating a virtual model of the site that includes
a first virtual representation of the wireless communication equipment virtually installed within the virtual model at the location at the site, and
a second virtual representation of the wireless communication equipment virtually installed within the virtual model in at least one alternative location at the site, wherein the at least one alternative location is different from the location; and
sending, to a permitting authority, one or more images of the first virtual representation and the second virtual representation of the wireless communication equipment virtually installed within the virtual model at the site.

16. The system according to claim 15, wherein the process further comprises:
determining a radio frequency signature at the location of the wireless communication equipment based on a type and size of one or more of the wireless communication equipment.

17. The system according to claim 15, wherein the process further comprises:
identifying a type and size of one or more of the wireless communication equipment at the site; and
determining the location at the site for the installation of the wireless communication equipment complies with the wireless equipment regulations based on the type and size of the one or more of the wireless communication equipment at the site.

18. The system according to claim 15, wherein the process further comprises:
  overlaying an image of the installation of a type and size of one or more of the wireless communication equipment with the one or more images of the first virtual representation to verify the installation complies with the wireless equipment regulations.

19. The system according to claim 15, wherein the process further comprises:
  generating a notification based on the location of the wireless communication equipment complying with the wireless equipment regulations.

20. The system according to claim 15, wherein the process further comprises:
  generating the virtual model with image data of the site, and wherein the site is a wireless communication tower or a rooftop location.

* * * * *